(12) United States Patent
Watanabe et al.

(10) Patent No.: US 6,686,844 B2
(45) Date of Patent: *Feb. 3, 2004

(54) HUMAN INTERFACE SYSTEM USING A PLURALITY OF SENSORS

(75) Inventors: Masaki Watanabe, Kawasaki (JP); Kentaro Murase, Kawasaki (JP); Takuya Noda, Kawasaki (JP); Kazuhiro Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/337,818

(22) Filed: Jan. 8, 2003

(65) Prior Publication Data
US 2003/0097190 A1 May 22, 2003

Related U.S. Application Data

(63) Continuation of application No. 09/940,661, filed on Aug. 29, 2001, now Pat. No. 6,583,723.

(30) Foreign Application Priority Data

Feb. 23, 2001 (JP) .......................................... 2001-48656

(51) Int. Cl.⁷ .............................................. G08B 23/00
(52) U.S. Cl. .................. 340/573.1; 340/5.1; 340/573.7; 340/686.1
(58) Field of Search ........................... 340/573.1, 573.7, 340/686.1, 5.1

(56) References Cited

U.S. PATENT DOCUMENTS 4,961,177 A  10/1990  Uehara ........................ 367/197

FOREIGN PATENT DOCUMENTS

| JP | 1-195499    | 8/1989  |
| JP | 10-31551 A  | 2/1998  |
| JP | 11-041577   | 2/1999  |
| JP | 2000-326274 | 11/2000 |

Primary Examiner—Jeffery Hofsass
Assistant Examiner—Son Tang
(74) Attorney, Agent, or Firm—Staas & Halsey LLP

(57) ABSTRACT

An image sensor, a voice sensor, an auxiliary sensor part (infrared sensor, etc.), a total analyzing part, and an application communicate with each other through data/control signal communication units. Each sensor provides feedback on its signal detection results and control information used by the other sensors for determining a range of a detection target and a detection sensitivity at a time of subsequent signal acquisition, to the other sensors through the communication units. The total analyzing part investigates whether or not there is inconsistency among the results detected by the respective sensors, and provide control information to each sensor. Each sensor determines a range of a signal detection target and a detection sensitivity based on the obtained information, and acquires a signal in accordance with the determination.

8 Claims, 10 Drawing Sheets

HUMAN INTERFACE SYSTEM USING A PLURALITY OF SENSORS

This application is a continuation of application Ser. No. 09/940,661, filed Aug. 29, 2001 U.S. Pat. No. 6,583,723, now allowed.

BACKGROUND OF THE INVENTION

1. Field of the Invention

The present invention relates to the technical field of man-machine interface. In particular, the present invention relates to an apparatus for operating electric home appliances such as a TV and a video recorder, and a computer operated by a voice and/or a gesture without using an input apparatus based on a button operation such as a remote controller, a mouse, a keyboard, or the like.

2. Description of the Related Art

At present, an input apparatus based on a button operation such as a remote controller, a mouse, a keyboard, or the like is widely used for operating electric home appliances such as a TV and a video recorder, and a computer. An apparatus for operating electric home appliances and a computer operated by a voice and/or a gesture without using an input apparatus based on a button operation is also being developed. JP 2000-326274 A describes a technique of identifying a person and inputting a command with a voice and/or a gesture of a user in man-machine interface.

According to the technique described in JP 2000-326274 A, visual information for identifying a person is obtained by a plurality of cameras. In this case, capture control such as search control of the position of a subject is conducted using only information obtained by the cameras. Furthermore, voice information used for voice recognition is obtained by a plurality of microphones. In this case, voice input control such as search control of the direction of a voice is conducted using only information obtained by a plurality of microphones disposed on the front, back, left, and right sides of a robot.

Regarding voice input control, the technique described in JP 1(1989)-195499 A is also known. According to the technique described in JP 1(1989)-195499 A, as in a security door, the position of a mouth of an entering person is found based on object detection results obtained by an ultrasonic sensor and picture data captured by a camera, and a microphone is adjusted in the direction of the mouth.

However, the above-mentioned conventional techniques have the following problems.

The conventional technique described in JP 2000-32674 A uses capture information from a camera that corresponds to an eye and voice information from a microphone that corresponds to an ear of an apparatus or a robot; however, they are used independently. A block diagram of FIG. 10 disclosed in JP 2000-32674 A does not show that information is exchanged between picture information processing and voice-information processing. Therefore, the technique described in JP 2000-32674 A has a problem that a picture of a person or a mannequin may be recognized as a human being, and voice information from a loudspeaker of acoustic equipment may be recognized as a human voice. Such matters are not intended by man-machine interface. A picture of a person, a mannequin, and a sound other than a human voice may become a noise for picture recognition and voice recognition, which decreases a recognition ratio. Furthermore, undesired information processing is conducted for inputting picture information and voice information obtained from an undesired target, which decreases a processing speed.

According to the technique described in JP 1(1989)-195499 A, as shown in FIG. 11, positional information on a search target from an ultrasonic sensor and a camera are used for controlling the direction of a microphone; however, processing results of voice information are not used. Furthermore, processing results of voice information from a microphone are not used for position detection control of a search target by an ultrasonic sensor and a camera. According to the technique described in JP 1(1989)-195499 A, in the case where a person enters an area (e.g., a door position of a room) where sensing and capturing are conducted by an ultrasonic sensor and a camera for the purpose of detecting an object, a voice can be efficiently obtained by adjusting the direction of a microphone. However, this is an effective technique only in the case where a narrow search area such as a door position of a room is previously set. Generally, in the case where there is no such limited search area, it may be often assumed that a person stands away from an ultrasonic sensor and a camera, and a command is input through a voice. Thus, the technique described in JP 1(1989)-195499 A cannot flexibly handle such a situation.

SUMMARY OF THE INVENTION

Therefore, with the foregoing in mind, it is an object of the present invention to select appropriate information as input information in man-machine interface, thereby preventing a malfunction of man-machine interface and enhancing a recognition ratio and a processing speed.

In order to solve the above-mentioned problem, a human interface system using a plurality of sensors according to the present invention includes: at least two kinds of sensors, each determining a range of a detection target and a detection sensitivity and acquiring a particular detection signal from the detection target at the detection sensitivity, the detection signals acquired by the sensors being of different types; a total analyzing part for investigating whether or not there is inconsistency among signal detection results detected by the respective sensors, and generating control information to the respective sensors; an application utilizing the signal detection results acquired by the respective sensors; and communication units for communicating data and control information between the respective sensors, between the respective sensors and the total analyzing part, and between the total analyzing part and the application, wherein each of the sensors uses either of or a combination of the signal detection results or control information obtained from the other sensors, and the control information obtained from the total analyzing part, thereby determining a range of a detection target and a detection sensitivity at a time of subsequent signal acquisition, each of the sensors outputs its signal detection results and control information used by the other sensors for determining a range of a detection target and a detection sensitivity at a time of subsequent signal acquisition, to the other sensors through the communication units, and the total analyzing part outputs control information used by each of the sensors for determining a range of a detection target and a detection sensitivity at a time of subsequent signal acquisition through the communication units.

Because of the above-mentioned configuration, an excellent human interface system can be provided, in which recognition results of a plurality of different kinds of sensors can be referred to each other, and signal acquisition control can be conducted so as not to cause inconsistency among the sensors, whereby a command inputted by a user can be recognized more exactly.

Furthermore, in the above-mentioned configuration, it is preferable that the detection target is a human being, and the sensors include at least an image sensor, a voice sensor, and an auxiliary sensor, a detection signal of the image sensor is human picture recognition information, the image sensor includes an action recognizing part for interpreting an action of the detection target based on picture recognition results, and recognizing a command inputted through a gesture, a detection signal of the voice sensor is human voice recognition information, the voice sensor includes a voice recognizing part for interpreting a voice of the detection target based on voice recognition results and recognizing a command inputted through a voice, and a detection signal of the auxiliary sensor is information useful for detecting human position information.

Because of the above-mentioned configuration, an excellent human interface system can be provided, in which action recognition results of the image sensor, voice recognition results of the voice sensor, and results of person's position information detected by the other sensors (i.e., auxiliary sensor) are referred to, whereby a command inputted by a user can be recognized more exactly without inconsistency.

In addition to a combination of action recognition results of an image sensor, voice recognition results of a voice sensor, and person's position information from the other sensors, the following combination of sensors and recognition results is also possible: combination of action recognition results of an image sensor and voice recognition results of a voice sensor; combination of action recognition results of an image sensor and person's position detection results of the other sensors; and combination of voice recognition results of a voice sensor and person's position detection results of the other sensors.

These and other advantages of the present invention will become apparent to those skilled in the art upon reading and understanding the following detailed description with reference to the accompanying figures.

DESCRIPTION OF THE PREFERRED EMBODIMENTS

Embodiment 1

A human interface system using a plurality of sensors of Embodiment 1 according to the present invention will be described.

According to the human interface system using a plurality of sensors of Embodiment 1 according to the present invention, in a process of capturing a picture by a camera and a process of recognizing the captured picture, and in a process of recording voice information by a microphone and a process of recognizing the recorded voice, the results of the respective processes, as well as the past results obtained by the respective processes are referred to. If required, information obtained by using auxiliary sensors such as an ultrasonic sensor, an infrared sensor and a range sensor, the results obtained by processing the information, and the results obtained by executing an application are also referred to. The sensors exchange analysis results and instructions on the control of signal acquisition with each other. Furthermore, in the above-mentioned human interface system, the analysis results obtained by a total analyzing part and instructions on the control of signal acquisition in each sensor are exchanged. Feedback processing is conducted while inconsistency among sensors is being investigated. A range of a target and a sensitivity for signal acquisition are exactly determined. Thus, an output with consistency among a plurality of sensors is generated.

For example, at the beginning of recognition processing, each sensor acquires a signal from the surrounding environment. The signal acquired by each sensor is analyzed, and the results thereof are given to the other sensors. In the subsequent process of acquiring a signal, the analysis results of the acquired signal in the previous process, the analysis results from the other sensors, and the analysis results obtained by the total analyzing part so as not to cause inconsistency among the sensors are taken into consideration. Thus, a range of a target and a sensitivity for signal acquisition in an environment are determined to acquire a signal First, a schematic apparatus configuration of the human interface system using a plurality of sensors of Embodiment 1 will be described.

Figure 1:
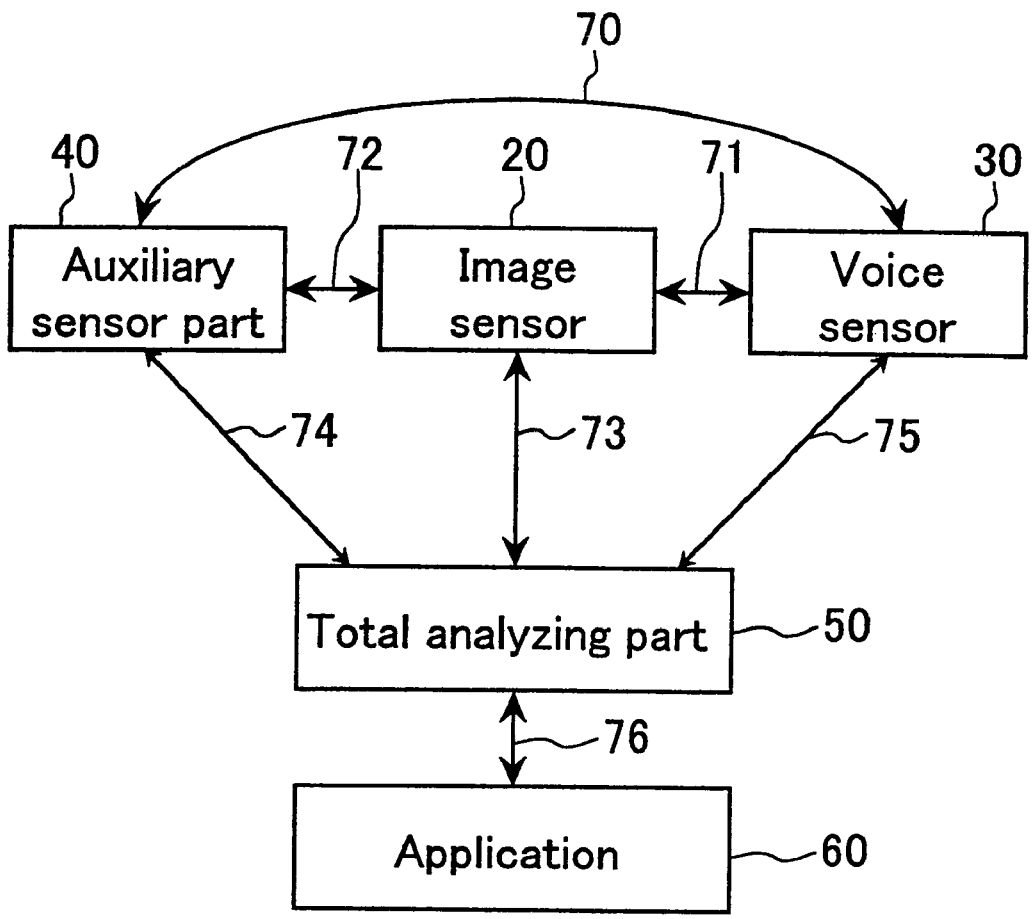
FIG. 1 is a diagram schematically showing an apparatus configuration of a human interface system using a plurality of sensors of Embodiment 1 according to the present invention.

FIG. 1 shows a schematic apparatus configuration of the human interface system using a plurality of sensors of Embodiment 1 according to the present invention. Reference numeral 10 denotes a sensor part, which includes an image sensor 20 and a voice sensor 30. Reference numeral 40 denotes an auxiliary sensor part, 50 denotes a total analyzing part, and 60 denotes an application. Herein, the auxiliary sensor part 40 includes at least one sensor capable of acquiring a useful signal other than those acquired by the image sensor 20 and the voice sensor 30, in accordance with a target for which the human interface system of the present invention is used.

As shown in FIG. 1, in the human interface system using a plurality of sensors of Embodiment 1 according to the present invention, the image sensor 20 and the voice sensor 30, and the auxiliary sensor part 40 respectively use signal processing results obtained by the other sensors during signal processing, and give an instruction on the control of the other sensors. As shown in FIG. 1, a data/control signal communication unit 71 is provided for bidirectionally exchanging signal processing results and control data between the image sensor 20 and the voice sensor 30. A data/control signal communication unit 72 is also provided for bidirectionally exchanging signal processing results and control data between the image sensor 20 and the auxiliary sensor part 40. A data/control signal communication unit 70 is also provided for bidirectionally exchanging signal processing results and control data between the voice sensor 30 and the auxiliary sensor part 40. Furthermore, data/control signal communication units 73, 74, and 75 are provided for bidirectionally exchanging signal processing results and control data between the image sensor 20 and the total analyzing part 50, between the auxiliary sensor part 40 and the total analyzing part 50, and between the voice sensor 30 and the total analyzing part 50. A data/control signal communication unit 76 is also provided for bidirectionally exchanging signal processing results and control data between the total analyzing part 50 and the application 60.

Figure 10:
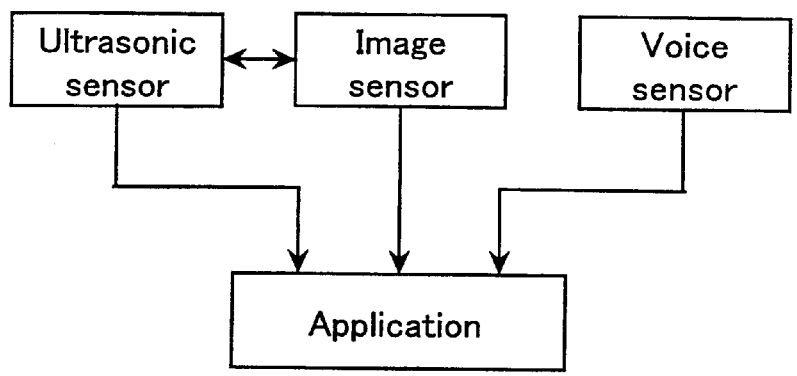
FIG. 10 is a diagram showing an example of a conventional interface using sensors.
Figure 11:
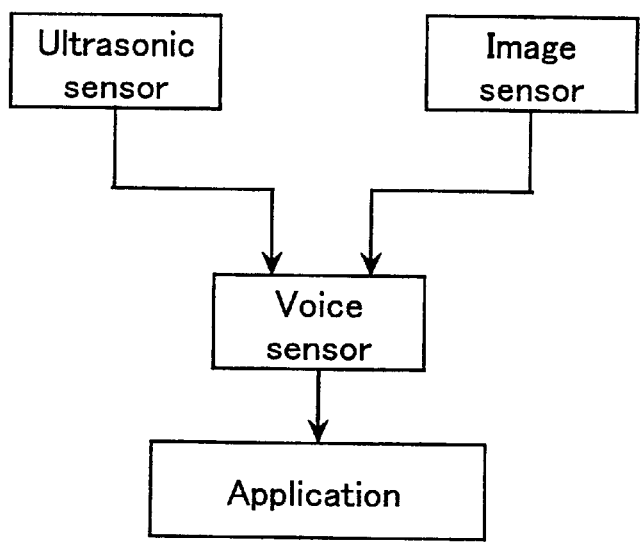
FIG. 11 is a diagram showing another example of a conventional interface using sensors.

According to the configuration shown in FIG. 10 described in the prior art, signal processing in each sensor is independently conducted, and the processing results are given to an application as independent information. According to the configuration in FIG. 11, although the processing results of the ultrasonic sensor and the image sensor are used in the processing of the voice sensor, information and control flow in one direction. In contrast, according to the present invention, the image sensor 20, the voice sensor 30, and the auxiliary sensor part 40 use the processing results of the other sensors through the data/control signal communication units 70, 71 and 72, and give an instruction on the control of the other sensors. Furthermore, each sensor uses the processing results of the total analyzing part 50 by feedback through the data/control signal communication units 73, 74, and 75, and receives an instruction on the control of each sensor from the total analyzing part 50. The total analyzing part 50 receives all the sensor processing results of the image sensor 20, the voice sensor 30, and the auxiliary sensor part 40, and conduct feedback processing while investigating the consistency among the sensors, thereby generating an output with consistency in the entire apparatus. Furthermore, the total analyzing part 50 refers to the execution results of the application 60 through the data/control signal communication unit 76, in accordance with the situation, receives an instruction on signal processing from the application 60, and controls each sensor based on the instruction.

Figure 2:
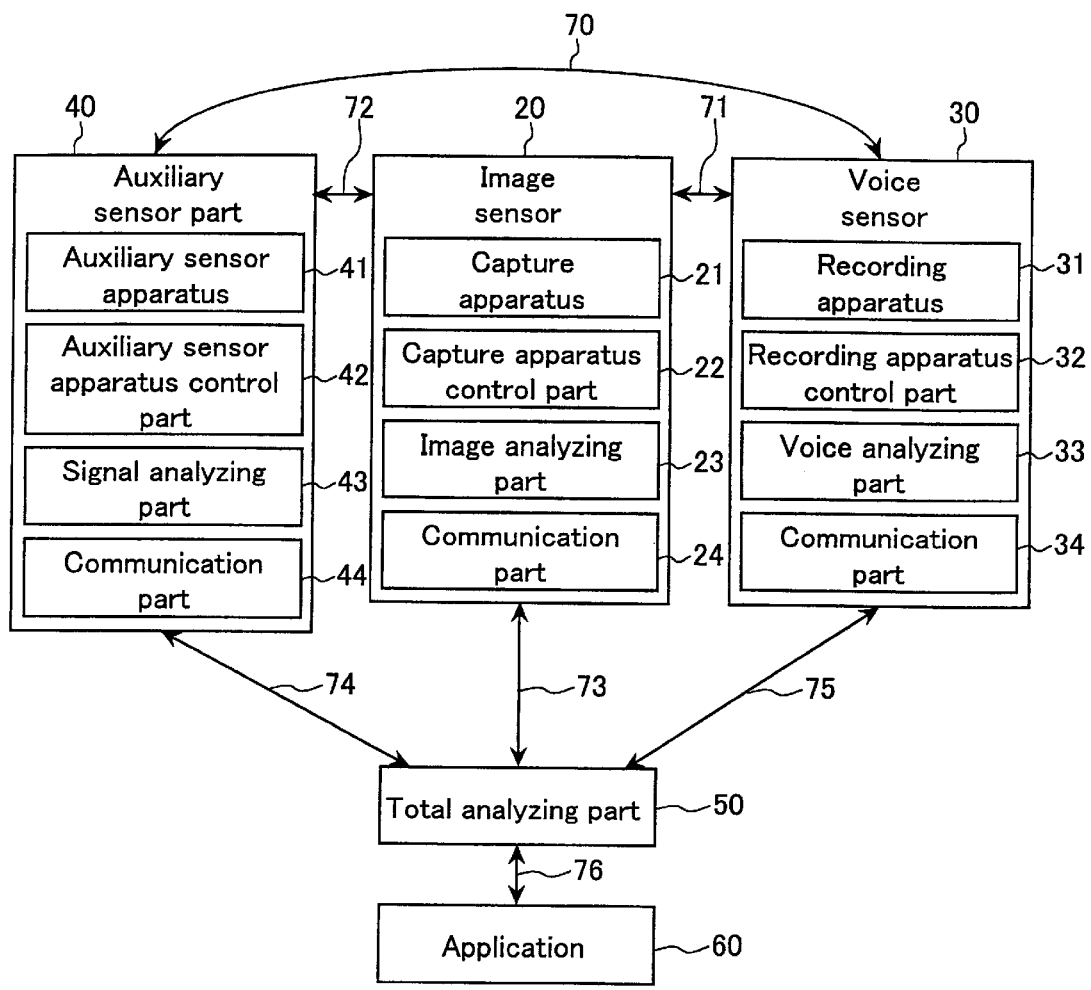
FIG. 2 is a diagram adopting a basic configuration in FIG. 1, in which an exemplary configuration of an image sensor, a voice sensor, and an auxiliary sensor in FIG. 1 is shown in detail.

FIG. 2 adopts the basic configuration in FIG. 1, in which an exemplary configuration of the image sensor 20, the voice sensor 30, and the auxiliary sensor 40 are described in detail.

The image sensor 20 and the voice sensor 30 are respectively provided with four parts: a sensor control part, a sensor apparatus, a sensor signal analyzing part, and a communication part as described below.

The image sensor 20 includes a capture apparatus 21, a capture apparatus control part 22, a picture analyzing part 23, and a communication part 24.

The voice sensor 30 includes a recording apparatus 31, a recording apparatus control part 32, a voice analyzing part 33, and a communication part 34.

The auxiliary sensor part 40 is provided with one or a plurality of different kinds of sensors capable of acquiring a useful signal in addition to those acquired by the image sensor and the voice sensor, with respect to a target for which the human interface system of the present invention is used. Examples of such sensors include an ultrasonic sensor, an infrared sensor, and a range sensor. Each auxiliary sensor in the auxiliary sensor part 40 includes four parts: an auxiliary sensor apparatus 41, an auxiliary sensor apparatus control part 42, a signal analyzing part 43, and a communication part 44.

The capture apparatus 21, the recording apparatus 31, and the auxiliary sensor apparatus 41 acquire a signal from an environment. The capture apparatus 21 captures a picture from an environment to generate picture information. The recording apparatus 31 records a sound from an environment to generate voice information. The auxiliary sensor apparatus 41 acquires a signal representing the status of an environment.

The communication parts 24, 34, and 44 control a communication interface with the other sensors or the total analyzing part 50 through the data/control signal communication units 70 to 75. The communication parts 24, 34, and 44 control an exchange of analysis results and an instruction on the control of signal acquisition.

The capture apparatus control part 22 and the picture analyzing part 23 cooperate to conduct sensor signal acquisition control and signal analysis. Similarly, the recording apparatus control part 32 and the voice analyzing part 33, and the auxiliary sensor apparatus control part 42 and the signal analyzing part 43 respectively cooperate to conduct sensor signal acquisition control and signal analysis. As the sensor signal acquisition control and signal analysis, there are first sensor signal acquisition control and signal analysis, second sensor signal acquisition control and signal analysis, and third sensor signal acquisition control and signal analysis.

The first sensor signal acquisition control and signal analysis will be described. In the sensor signal acquisition control, a range of a target and a sensitivity for signal acquisition in an environment are determined, and sensor apparatuses (i.e., the capture apparatus 21, the recording apparatus 31, and the auxiliary sensor apparatus 41) are controlled. If required, each sensor obtains the analysis results of the other sensors (i.e., those included in the image sensor 20, the voice sensor 30, and the auxiliary sensor part 40), the results of the total analyzing part 50, and the past analysis results of the sensor in question, through the data/control signal communication units 70 to 75, and controls its sensor apparatus by referring to those results. In the signal analysis, if required, the analysis results of the other sensors, the results of the total analyzing part 50, and the past analysis results of the sensor in question are obtained, and a signal is analyzed by referring to those results.

According to the second sensor signal acquisition control and signal analysis, weight is further laid on the feedback of the analysis results and the control instruction among the other sensors and the total analyzing part 50, compared with the first sensor signal acquisition control and signal analysis. In the sensor signal acquisition control, each sensor obtains an instruction on a range of a target and a sensitivity for signal acquisition in an environment from the other sensors or the total analyzing part 50, through the data/control signal communication units 70 to 75, and controls its sensor apparatus in accordance with the instruction. In the case where the sensor has not obtained such an instruction at the beginning of control, if required, the sensor in question obtains the analysis results of the other sensors, the results of the total analyzing part 50, and the past analysis results of the sensor in question, through the data/control signal communication units 70 to 75, and determines a range of a target and a sensitivity for signal acquisition in an environment by referring to those results, thereby controlling its sensor apparatus. In the signal analysis, if required, the analysis results of the other sensors, the results of the total analyzing part 50, and the past analysis results of the sensor in question are obtained through the data/control signal communication units 70 to 75, and a signal is analyzed by referring to those results. Furthermore, based on the analysis results,/if required, instruction data on a range of a target and a sensitivity for signal acquisition in an environment is given to the other sensors through the data/control signal communication units 70 to 75.

According to the third sensor signal acquisition control and signal analysis, in the same way as in the second sensor signal acquisition control and signal analysis, weight is laid on the feedback of the analysis results and the control instruction among the other sensors and the total analyzing part 50. In addition, feedback is not only received passively, but also whether or not feedback information is applied is determined autonomously. First, in the sensor signal acquisition control, a sensor in question obtains a feedback instruction on a range of a target and a sensitivity for signal acquisition from the other sensors or the total analyzing part 50 through the data/control signal communication units 70 to 75. Then, the sensor in question determines whether or not to follow the instruction by referring to the analysis results of the other sensors, the results of the total analyzing part 50, and the past analysis results of the sensor in question. In the case where the sensor determines to follow the instruction, the sensor in question controls its sensor apparatus in accordance with the instruction. In the case where the sensor in question determines not to follow the instruction, or in the case where there is no feedback of the instruction on a range of a target and a sensitivity for signal acquisition from the other sensors and the total analyzing part 50, a range of a target and a sensitivity for signal acquisition are determined, referring to the analysis results of the other sensors, the results of the total analyzing part 50, and the analysis results of the sensor in question, which have already been obtained. Thus, the sensor apparatus of the sensor in question is controlled. The signal analysis may be similar to that described in the second sensor signal acquisition control and signal analysis.

Next, the total analyzing part 50 will be described.

The total analyzing part 50 obtains the results with the least inconsistency among a plurality of sensors by referring to the analysis results of the image sensor 20, the voice sensor 30 and the auxiliary sensor part 40, and the execution results of the application 60. Based on the analysis results, the total analyzing part 50 gives an instruction on a range of a target and a sensitivity for signal acquisition in an environment to the image sensor 20, the voice sensor 30, and the auxiliary sensor part 40, if required.

The total analyzing part 50 obtains the analysis results of the image sensor 20, the voice sensor 30, and the auxiliary sensor part 40 through the data/control signal communication units 73, 74, and 75. Furthermore, the total analyzing part 50 obtains an instruction on the control of a sensor from the application 60 through the data/control signal communication unit 76. The total analyzing part 50 provides the signal processing results to the application 60 through the data/control signal communication unit 76. Furthermore, the total analyzing part 50 obtains the execution results from the application 60, if required. Thus, the total analyzing part 50 obtains the results with the least inconsistency among a plurality of sensors, based on the obtained information. Based on the analysis results, if required, the total analyzing part 50 gives an instruction on a range of a target and a sensitivity for signal acquisition in an environment to the image sensor 20, the voice sensor 30, and the auxiliary sensor part 40 through the data/control signal communication units 73, 74, and 75.

Figure 3:
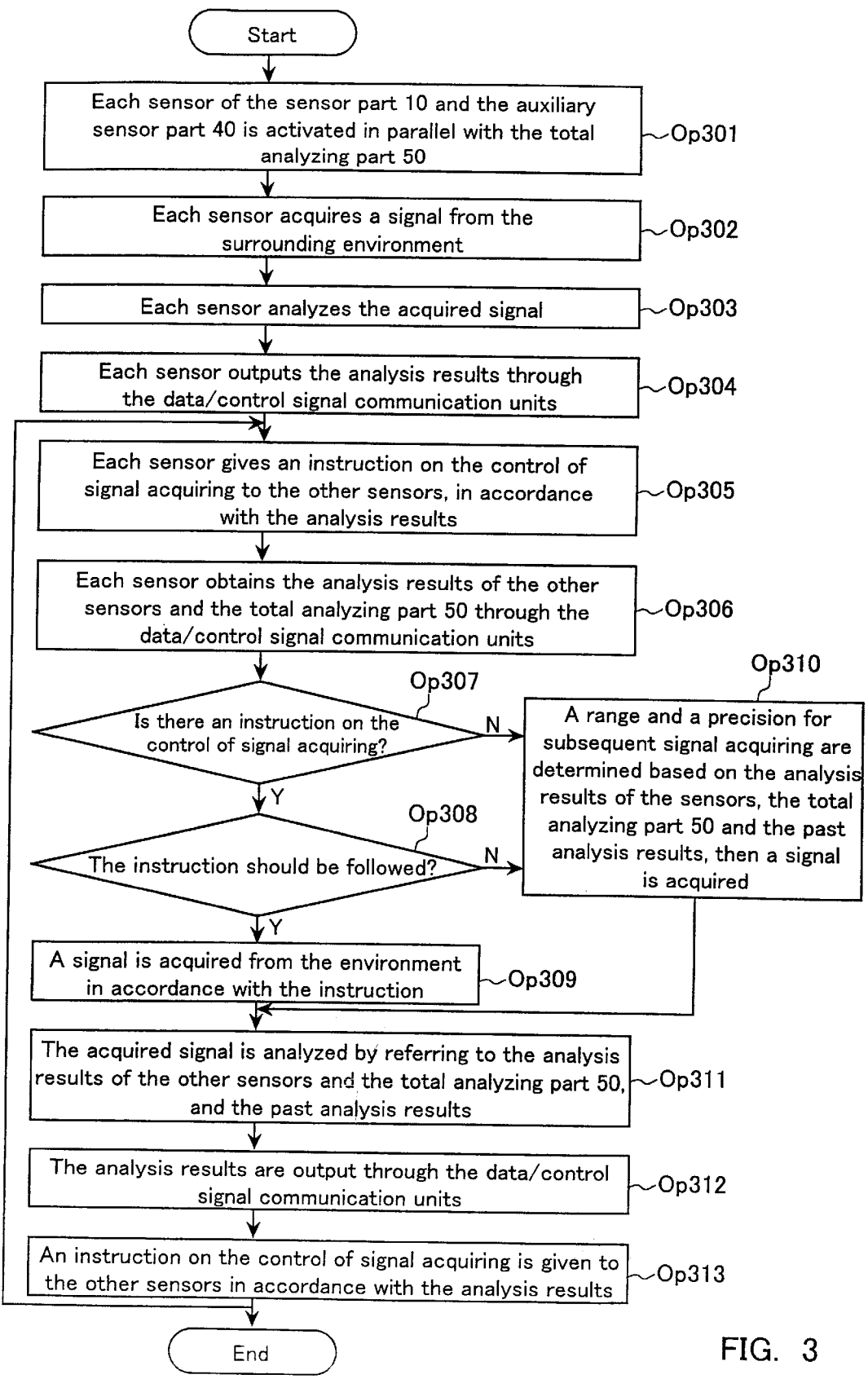
FIG. 3 is a flow chart showing a flow of signal processing of the human interface system using a plurality of sensors of Embodiment 1 according to the present invention.

Next, a flow of signal processing of a human interface system using a plurality of sensors of Embodiment 1 according to the present invention will be described with reference to a flow chart in FIG. 3.

First, the image sensor 20, the voice sensor 30, and the auxiliary sensor part 40 are activated in parallel with the total analyzing part 50 (Operation 301).

The image sensor 20, the voice sensor 30, and the auxiliary sensor part 40 first acquire a signal from the surrounding environment, using the capture apparatus 21, the recording apparatus 31, or the auxiliary sensor apparatus 41 (Operation 302).

The image sensor 20, the voice sensor 30, and the auxiliary sensor part 40 analyze the signal acquired in Operation 302, using the picture analyzing part 23, the voice analyzing part 33, or the signal analyzing part 43 (Operation 303).

The image sensor 20, the voice sensor 30, and the auxiliary sensor part 40 output the analysis results through the data/control signal communication units 70 to 75 (Operation 304), and give an instruction on the control of signal acquisition to the other sensors, in accordance with the analysis results (Operation 305).

The image sensor 20, the voice sensor 30, and the auxiliary sensor part 40 obtain the analysis results of the other sensor and the auxiliary sensor part 40 and the total analyzing part 50, and the instruction on the control of signal acquisition received from the other sensors, through the data/control signal communication units 70 to 75 (Operation 306).

Next, the presence/absence of an instruction on the control of signal acquisition from the other sensor and the total analyzing part 50 is checked through the data/control signal communication units 70 to 75 (Operation 307).

If there is an instruction on the control of signal acquisition (Operation 307: Y), in the case where the analysis results of the other sensor and the total analyzing part 50, and the past analysis results are referred to, it is determined whether or not the instruction should be followed (Operation 308). In the case where it is determined that the instruction should be followed (Operation 308: Y), each sensor acquires the signal of the environment in accordance with the instruction, using the capture apparatus 21, the recording apparatus 31, or the auxiliary sensor apparatus 41 (Operation 309).

In the case where it is not determined that the instruction should be followed in Operation 308 (Operation 308: N), or in the case where there is no instruction on the control of signal acquisition in Operation 307 (Operation 307: N), a range of a target and a sensitivity for signal acquisition in an environment are determined based on the analysis results of the other sensors and the total analyzing part 50, and the analysis results of the sensor in question, and a signal is acquired from the environment in accordance with the determination (Operation 310).

Next, the acquired signal is analyzed by referring to the analysis results of the other sensors and the total analyzing part 50, and the past analysis results (Operation 311).

The analysis results are output through the data/control signal communication units 70 to 75 (Operation 312).

Furthermore, an instruction on the control of signal acquisition is given to the other sensors in accordance with the analysis results (Operation 313).

Operations 305 to 313 are repeated.

Figure 4:
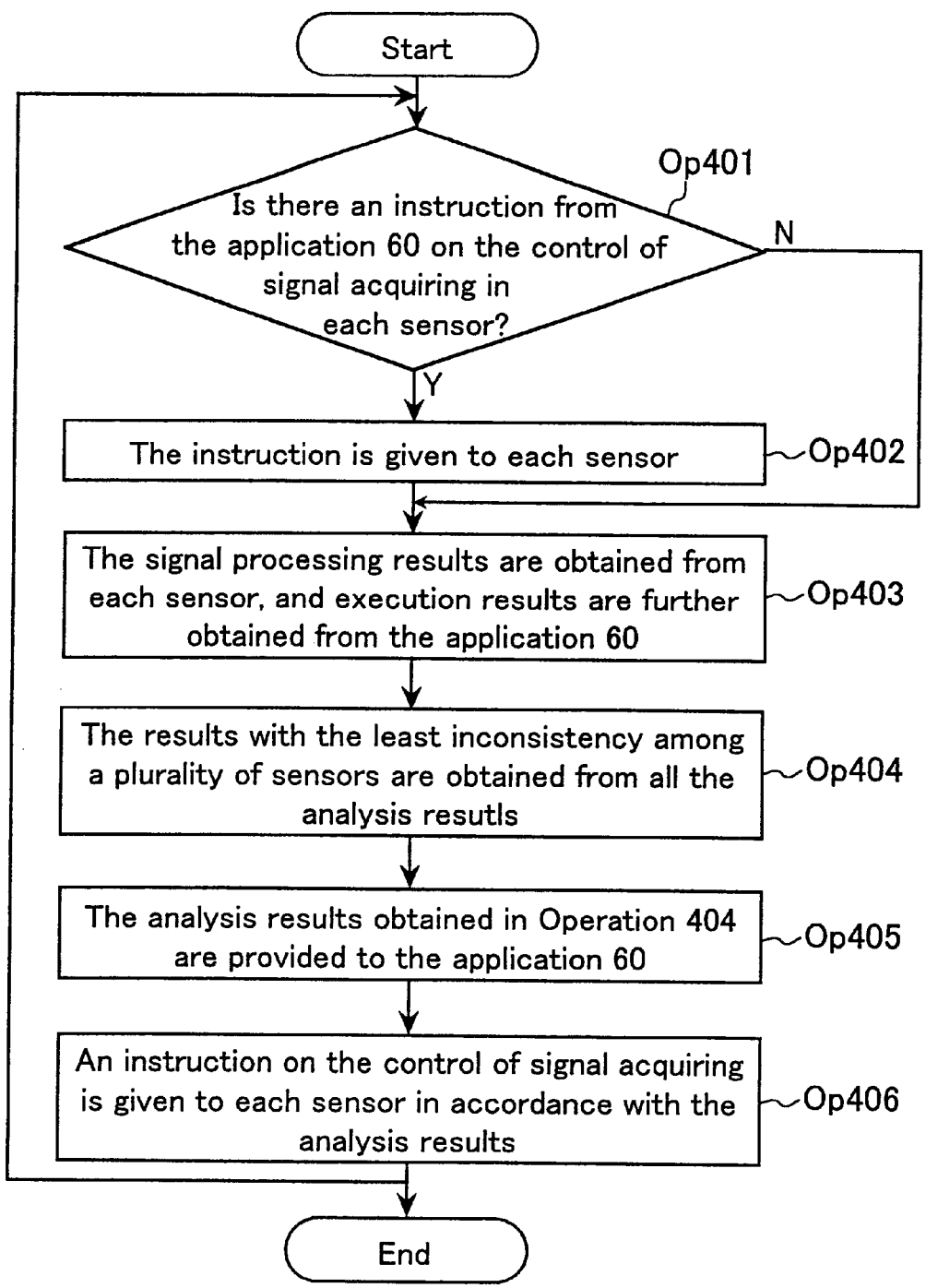
FIG. 4 is a flow chart showing a flow of signal processing of a total analyzing part in Embodiment 1 according to the present invention.

The total analyzing part 50 executes processing in accordance with the flow shown in the flow chart in FIG. 4.

The total analyzing part 50 checks the presence/absence of an instruction from the application 60 on the control of signal acquisition in the image sensor 20, the voice sensor 30, and the auxiliary sensor part 40 through the data/control signal communication unit 76 (Operation 401). If there is an instruction (Operation 401: Y), the instruction is given to each sensor (Operation 402). In the case where there is no instruction, the process proceeds to Operation 403.

The total analyzing part 50 obtains the signal processing results from each sensor through the data/control signal communication units 70 to 75, and further obtains execution results from the application 60 through the data/control signal communication unit 76 (Operation 403).

The total analyzing part 50 obtains the results with the least inconsistency among a plurality of sensors from all the analysis results (Operation 404).

The total analyzing part 50 provides the analysis results to the application 60 through the data/control signal communication unit 76 (Operation 405). Furthermore, the total analyzing part 50 gives an instruction on the control of signal acquisition to each sensor through the data/control signal communication units 70 to 75, in accordance with the analysis results (Operation 406).

Operations 401 to 406 are repeated.

As described above, in the human interface system using a plurality of sensors of the present invention, the image sensor 20, the voice sensor 30, and the auxiliary sensor part 40 exchange the analysis results and instructions on the control of signal acquisition with each sensor. Each sensor further exchanges the analysis results and the instruction on the control of signal acquisition with the total analyzing part 50, and executes feedback processing while investigating inconsistency among sensors. Thus, a range of a target and a sensitivity for signal acquisition are exactly determined, whereby an output with consistency in the entire apparatus can be generated.

Embodiment 2

Figures 5A, 5B, 5C:
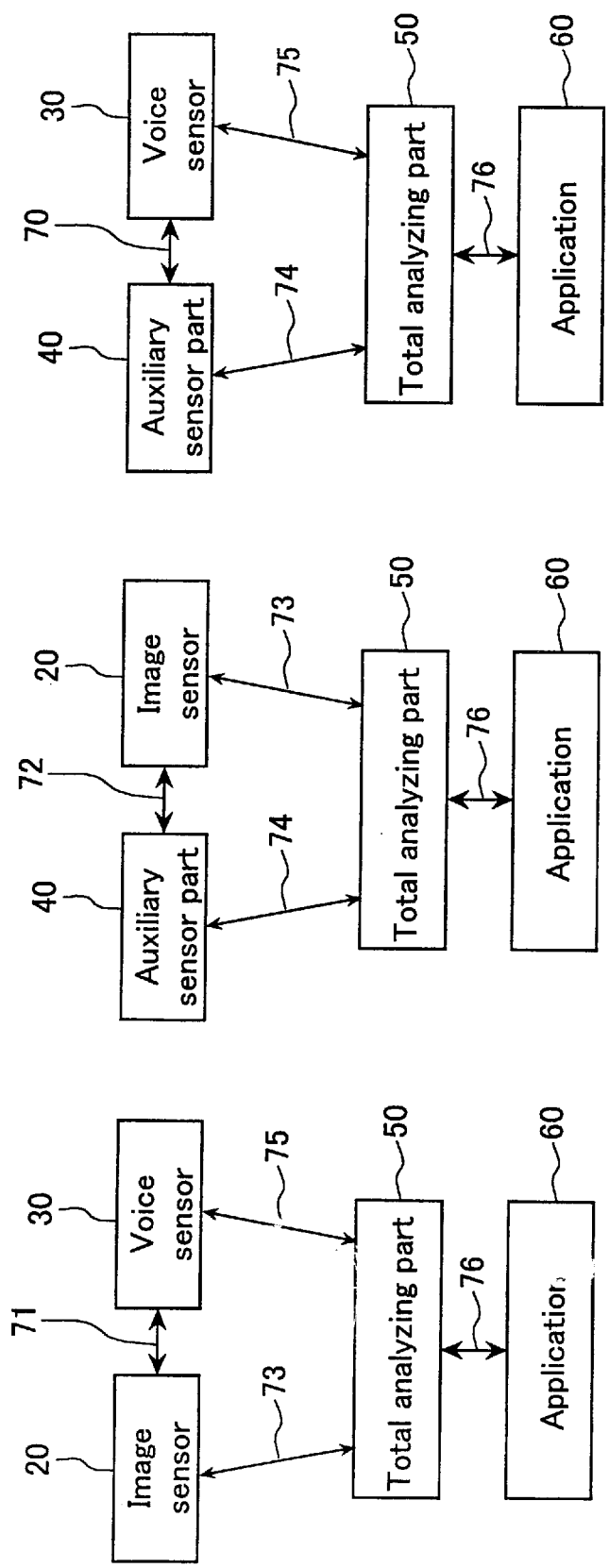
FIGS. 5A to 5C are diagrams showing exemplary configurations of Embodiment 2 according to the present invention, in which the configuration of Embodiment 1 is modified.

A human interface system using a plurality of sensors of Embodiment 2 according to the present invention is obtained by modifying the configuration in Embodiment 1. In the configuration shown in FIG. 1 described in Embodiment 1, there are provided the image sensor 20, the voice sensor 30, and the auxiliary sensor part 40. FIGS. 5A to 5C show variations of the configuration in Embodiment 1. FIG. 5A shows the configuration shown in FIG. 1 with the auxiliary sensor part 40 omitted. FIG. 5B shows the configuration shown in FIG. 1 with the voice sensor 30 omitted. FIG. 5C shows the configuration shown in FIG. 1 with the image sensor 20 omitted.

FIG. 5A shows the case where the auxiliary sensor part 40 is not required. Signal processing results are obtained between the image sensor 20 and the voice sensor 30 through the data/control signal communication unit 71. Furthermore, the image sensor obtains the analysis results from the total analyzing part 50 through the data/control signal communication unit 73. Furthermore, the voice sensor obtains the analysis results from the total analyzing part 50 through the data/control signal communication unit 75. Furthermore, the contents of the control instruction from the application 50 is obtained via the total analyzing part 50 through the data/control signal communication unit 76. Among all the results, those with the least inconsistency among a plurality of sensors are obtained.

FIG. 5B shows the case where the voice sensor 30 is omitted, and an application is operated only with picture information. Signal processing results are obtained between the image sensor 20 and the auxiliary sensor part 40 through the data/control signal communication unit 72. Furthermore, the auxiliary sensor part obtains the analysis results from the total analyzing part 50 through the data/control signal communication unit 74. Furthermore, the image sensor obtains the analysis results from the total analyzing part 50 through the data/control signal communication unit 73. Furthermore, the contents of the control instruction from the application 60 is obtained via the total analyzing part 50 through the data/control signal communication unit 76. Among all the results, those with the least inconsistency are obtained.

FIG. 5C shows the case where the image sensor 20 is omitted, and an application is operated only with voice information. Signal processing results are obtained between the voice sensor 30 and the auxiliary sensor part 40 through the data/control signal communication unit 72. Furthermore, the auxiliary sensor part obtains the analysis results from the total analyzing part 50 through the data/control signal communication unit 74. Furthermore, the voice sensor obtains the analysis results from the total analyzing part 50 through the data/control signal communication unit 75. Furthermore, the contents of the control instruction from the application 60 is obtained via the total analyzing part 50 through the data/control signal communication unit 76. Among all the results, those with the least inconsistency are obtained.

In any case, in the same way as in Embodiment 1, processing results and control are exchanged among sensors, and these results are totalized and analyzed to generate an output, whereby a range and a sensitivity of a signal to be acquired from an environment during the subsequent process are determined.

Embodiment 3

In a human interface system using a plurality of sensors of Embodiment 3 according to the present invention, the basic configuration in Embodiment 1 is applied to a human interface system that accepts operation instructions based on inputs of a human voice and a gesture. In such a human interface system, analysis results and instructions on the control of signal acquisition are exchanged, whereby an output with consistency among a plurality of sensors is generated while the inconsistency among sensors is being investigated. In addition, the system analyzes and accepts the operation instructions based on inputs of a human voice and a gesture to be detection targets.

Figure 6:
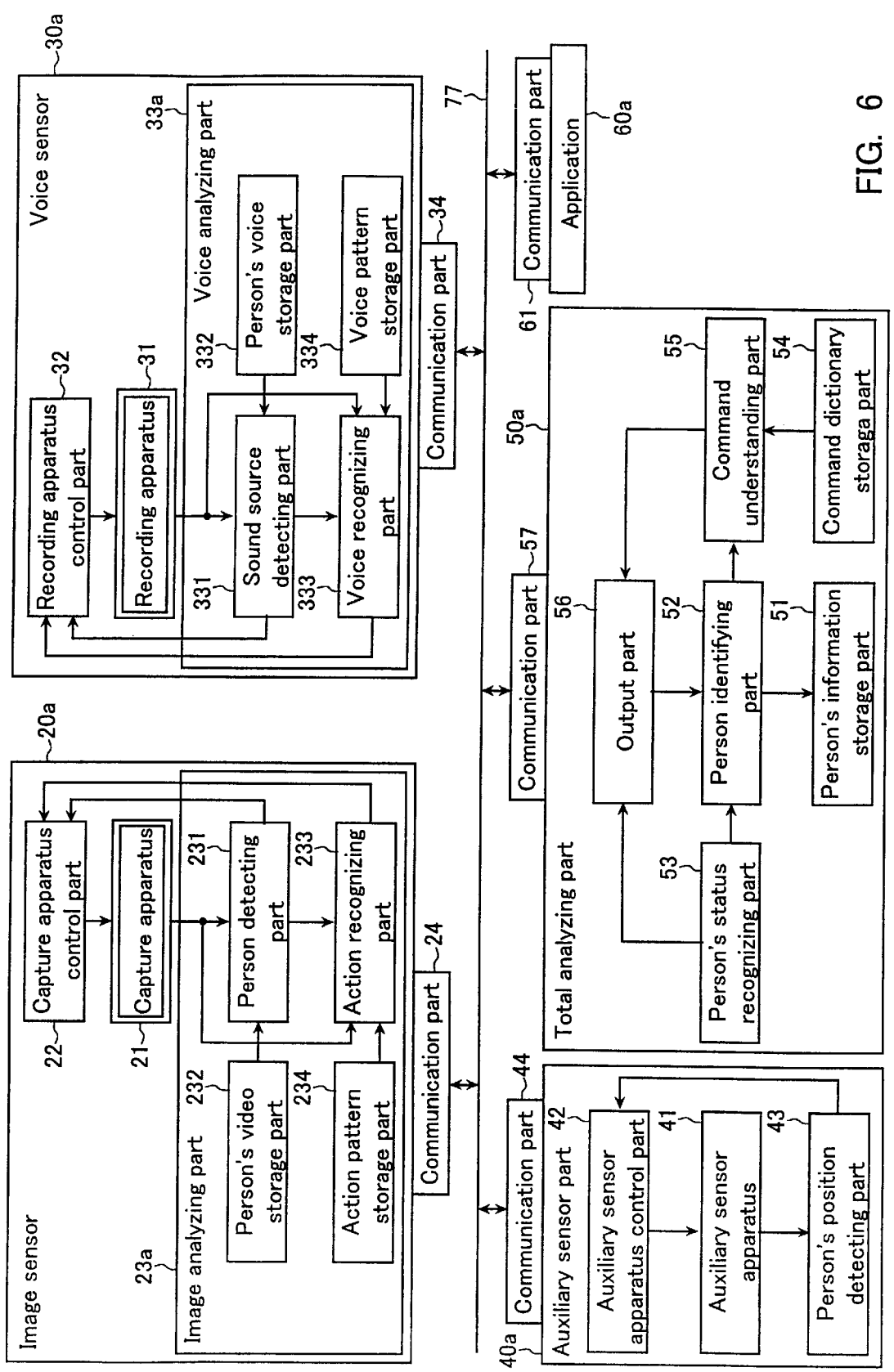
FIG. 6 is a block diagram schematically showing an apparatus configuration of a human interface system using a plurality of sensors of Embodiment 3 according to the present invention.

FIG. 6 is a block diagram showing a schematic configuration of an apparatus of the human interface system using a plurality of sensors of Embodiment 3 according to the present invention. As shown in FIG. 6, the apparatus includes an image sensor 20a, a voice sensor 30a, an auxiliary sensor part 40a, a total analyzing part 50a, and an application 60a. Detection targets are a human being, a human voice, and a human gesture.

Herein, the image sensor 20a includes a gesture analyzing function for analyzing the contents of an operation instruction based on a human movement and a gesture, in addition to the function of obtaining human picture data. Furthermore, the voice sensor 30a includes a voice analyzing function for analyzing the contents of an operation instruction based on a human voice, in addition to the function of obtaining human voice data. Furthermore, the auxiliary sensor part 40a acquires a useful signal with respect to the processing of the image sensor 20a and the voice sensor 30*a*. For example, an ultrasonic sensor is a sensor useful for detecting the position of a human being and that a human being is not a still object such as a mannequin and a radio, but a moving object. An infrared sensor (i.e., a sensor generating thermography) is a sensor useful for detecting that a human being is not a lifeless object such as a mannequin and a radio, but a living creature.

In the exemplary configuration, the respective data/control signal communication units 70 to 76 share one communication path 77.

The configuration and processing contents of each sensor will be described in more detail.

The image sensor 20*a* includes a capture apparatus 21, a capture apparatus control part 22, a picture analyzing part 23*a*, and a communication part 24. The picture analyzing part 23*a* includes a person detecting part 231, a person's video storage part 232, an action recognizing part 233, and an action pattern storage part 234.

The capture apparatus 21 is at least one apparatus, such as a camera, for capturing a video, which captures a scene in a capture range as a picture. The capture apparatus 21 can dynamically change a capture direction.

The capture apparatus control part 22 determines the direction, position, and optical parameters for capturing picture information, based on the person detection results by picture analysis of the picture analyzing part 23*a*, the sound source detection results by voice analysis of the voice sensor 30*a*, and the person position detection results by the auxiliary sensor 40*a*, and controls the capture apparatus 21. The capture control part 22 may receive an instruction on the control of capture from the total analyzing part 50*a* and the application 60*a*.

The picture analyzing part 23*a* analyzes a picture. In Embodiment 3, the picture analyzing part 23*a* detects a person by picture analysis, and recognizes a command inputted through a gesture.

The person detecting part 231 searches for a video pattern corresponding to a person from picture information. The person detecting part 231 searches for a person's picture pattern from the picture information captured by the capture apparatus 21, referring to picture patterns stored in the person's video storage part 232. Then, the person detecting part 231 determines the position of a person from the position of the person's picture pattern on a picture and the position of the capture apparatus 21, and determines the direction of the person in accordance with the way the person is seen on the picture.

The person's video storage part 232 stores picture patterns to be searched for. Herein, the person's video storage part 232 stores a video pattern that can be recognized as a human being.

The action recognizing part 233 analyzes the movement (gesture) of person's picture data detected by the person detecting part 231, and recognizes a command inputted through a gesture. In recognizing an action, the action recognizing part 233 matches an action with data in the action pattern storage part 234, and recognizes a command inputted by the person through a gesture.

The action pattern storage part 234 stores a command and a video of a human action pattern so that they are associated with each other.

Hereinafter, action recognition processing in the image sensor 20*a* will be described when the image sensor 20*a* receives data and feedback of a control instruction from the voice sensor 30*a*, the auxiliary sensor 40*a*, and the total analyzing part 50*a*.

Recognition of a human action based on picture information and voice information is conducted using positional information on a sound source of a person's voice detected by the voice sensor 30*a*, and change information in picture of the person at a predetermined time. At this time, the information of the action pattern storage part 234 is referred to.

Recognition of a human action based on picture information, voice information, and person detection information from the auxiliary sensor 40*a* is conducted using positional information on a sound source of a person's voice detected by the voice sensor 30*a*, person's position information detected by the auxiliary sensor 40*a*, and change information in picture of the person at a predetermined time. At this time, the information of the action pattern storage part 234 is referred to.

Recognition of a human action based on picture information, voice information, human detection information from the auxiliary sensor 40*a*, analysis results of the total analyzing part 50*a*, and a control instruction from the application 60*a* is conducted using positional information on a sound source of a person's voice detected by the voice sensor 30*a*, the person's position information detected by the auxiliary sensor 40*a*, analysis information with the least inconsistency among the sensors obtained by the total analyzing part 50*a*, the contents of a control instruction from the application 60*a*, and change information in picture of the person at a predetermined time. At this time, the information from the action pattern storage part 234 is referred to.

Next, the voice sensor 30*a* includes a recording apparatus 31, a recording apparatus control part 32, a voice analyzing part 33*a*, and a communication part 34. The voice analyzing part 33*a* includes a sound source detecting part 331, a person's voice storage part 332, a voice recognizing part 333, and a voice pattern storage part 334.

The recording apparatus 31 is at least one apparatus, such as a microphone, for capturing a voice, which captures a voice as voice information. The recording apparatus 31 can dynamically set its direction.

The recording apparatus control part 32 determines the direction, position, and acoustic parameters for capturing voice information, based on the person detection results of the image sensor 20*a*, the sound source detection results of the voice analyzing part 33*a*, and the person's position detection results of the auxiliary sensor 40*a*, and controls the recording apparatus 31. The recording apparatus control part 32 may receive an instruction on capture control from the total analyzing part 50*a* and the application 60*a*.

The voice analyzing part 33*a* analyzes a voice. In Embodiment 3, the voice analyzing part 33*a* detects a person by voice analysis, and recognizes a command inputted through a voice.

The sound source detecting part 331 searches for a voice pattern corresponding to a person from voice information. The sound source detecting part 331 searches for a sound source having a person's voice pattern, by comparing the voice information with the acoustic pattern corresponding to the person stored in the person's voice storage part 332, and determines the direction of a sound source corresponding to a human voice, based on the position of the recording apparatus 31 and the strength of the acoustic pattern corresponding to the person.

The person's voice storage part 332 stores voice patterns to be searched for. Herein, the person's voice storage part 332 stores an acoustic pattern spoken by a human being.

The voice recognizing part 333 analyzes a voice input detected by the sound source detecting part 31, and recognizes a command inputted through a voice. In recognizing a voice, the voice pattern storage part 334 matches a voice with data, and recognizes a command inputted by the person through a voice.

The voice pattern storage part 334 stores a command and a human action pattern so that they are associated with each other.

Hereinafter, voice recognition processing in the voice sensor 30a will be described when the voice sensor 30a receives data and feedback of a control instruction from the image sensor 20a, the auxiliary sensor 40a, and the total analyzing part 50a.

Recognition of a human voice based on picture information and voice information is conducted using object position information having a person's video detected by the image sensor 20a, and voice information of the person at a predetermined time. At this time, the information from the voice pattern storage part 334 is referred to.

Recognition of a human voice based on picture information, voice information, and person detection information from the auxiliary sensor 40a is conducted using object position information having a person's video detected by the image sensor 20a, person's position information detected by the auxiliary sensor 40a, and voice information of the person at a predetermined time. At this time, the information from the voice pattern storage part 334 is referred to.

Recognition of a human voice based on picture information, voice information, human detection information from the auxiliary sensor 40a, analysis results of the total analyzing part 50a, and a control instruction of the application 60a is conducted using object position information having a person's video detected by the image sensor 20a, human position information detected by the auxiliary sensor 40a, analysis information with the least inconsistency among the sensors obtained by the total analyzing part 50a, the contents of a control instruction from the application 60a, and voice information of the person at a predetermined time. At this time, the information from the voice pattern storage part 334 is referred to.

The auxiliary sensor 40a includes an auxiliary sensor apparatus 41, an auxiliary sensor apparatus control part 42, a person's position detecting part 43, and a communication part 44.

The auxiliary sensor apparatus 41 is a sensor sensing information other than a picture and a voice, such as an ultrasonic sensor, an infrared sensor, and a range sensor. The auxiliary sensor is provided with at least one sensor for observing changes in movement of an environment, and obtains information useful for detecting the position of a person. The auxiliary sensor apparatus 41 can dynamically set a search range and a sensitivity.

The auxiliary sensor apparatus control part 42 determines the direction, position, and feature parameters for acquiring a signal by the auxiliary sensor part 40a, based on the person detection results of the image sensor 20a, the sound source detection results of the voice analyzing part 33a, and the person's position detection results of the auxiliary sensor part 40a, and controls the auxiliary sensor apparatus 41. The auxiliary sensor apparatus control part 42 may receive an instruction on the capture control from the total analyzing part 50a and the application 60a.

The person's position detecting part 43 is one example of the signal analyzing part 43. The person's position detecting part 43 detects the position of a person based on an output of the auxiliary sensor part 40a. For example, if the auxiliary sensor apparatus 41 is an ultrasonic sensor, the position of an object is detected by analysis of a reflected wave. If the auxiliary sensor apparatus 41 is an infrared sensor, the position of an object radiating heat at around a human temperature is detected.

Hereinafter, person's position detection processing in the auxiliary sensor part 40a will be described when the auxiliary sensor part 40a receives data and feedback of a control instruction from the image sensor 20a, the voice sensor 30a, and the total analyzing part 50a.

Detection of a person's position based on picture information and voice information is conducted using object position information having a person's video detected by the image sensor 20a, sound source position information detected by/the voice sensor 30a, and a signal of the person detected by the auxiliary sensor part 40a at a predetermined time.

Voice recognition based on picture information, voice information, person detection information from the auxiliary sensor part 40a, analysis results of the total analyzing part 50a, and a control instruction from the application 60 is conducted using object position information having a person's video detected by the image sensor 20a, sound source position information detected by the voice sensor 30a, human position information detected by the auxiliary sensor part 40a, analysis information without inconsistency among the sensors obtained by the total analyzing part 50a, the contents of a control instruction from the application 60, and a signal of the person detected by the auxiliary sensor part 40a at a predetermined time.

The total analyzing part 50a includes a person's information storage part 51, a person identifying part 52, a person's status recognizing part 53, a command dictionary storage part 54, a command understanding part 55, an output part 56, and a communication part 57.

The person's information storage part 51 stores various kinds of information including a video pattern and a voice pattern of a particular person to be detected.

The person identifying part 52 identifies a person detected by the image sensor 20a, the voice sensor 30a, and the auxiliary sensor part 40a. In identification processing, the person identifying part 52 studies the identification results of the image sensor 20a, those of the voice sensor 30a, those of the auxiliary sensor part 40a, and the information from the person's information storage part 51 in a comprehensive manner, and in the case where results with inconsistency are obtained, determines any or all of the identification results of the respective sensors to be incorrect.

The person's status recognizing part 53 determines the position, direction, and posture of a person, based on a person's position calculated by using the information from the auxiliary sensor part 40a, human detection results based on picture information, and sound source detection results based on voice information.

The command dictionary storage part 54 stores two kinds of information. One is a link representing a relation between each command given to the application 60a and a command in the action pattern storage part 234 and the voice pattern storage part 334. The other is a list of commands that can be accepted by the application in the respective cases. The latter information is rewritten by the application 60a during execution from one minute to another.

In the case where a person is identified in the person identifying part 52, the command understanding part 55 understands a command inputted by the person, based on action recognition results of the action recognizing part 233 and voice recognizing results of the voice recognizing part 333. At this time, the information of the command dictionary storage part 54 provided by the application is referred to.

The output part 56 provides the person identification results, the person's status recognition results, and the command understanding results to the application 60a.

Next, a processing flow is described.

Figure 7:
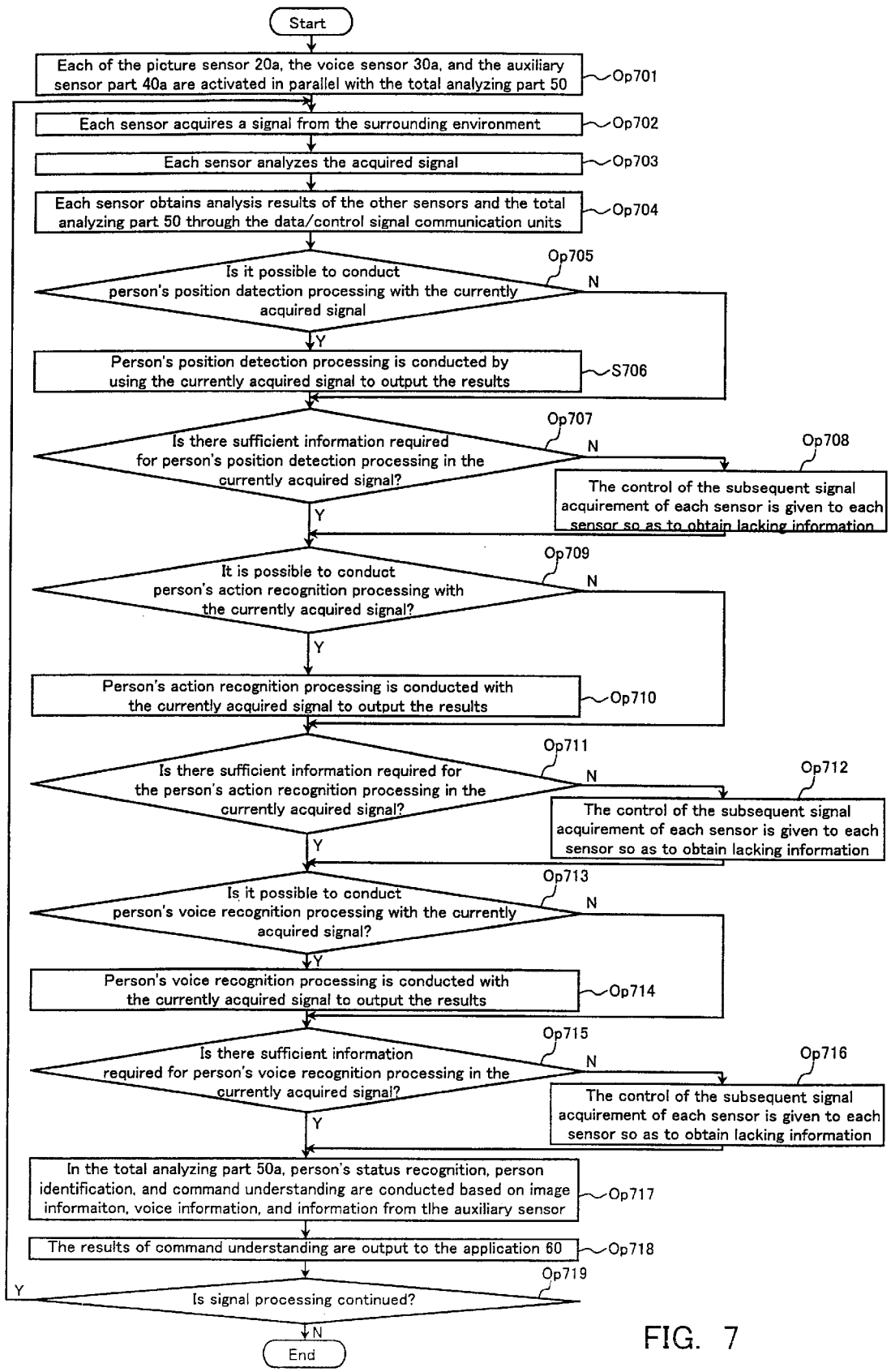
FIG. 7 is a flow chart showing a processing flow of an entire human interface system of Embodiment 3 according to the present invention.

FIG. 7 is a flow chart showing an outline processing flow in the human interface system of Embodiment 3. Each process will be described in detail later.

First, each of the image sensor 20a, the voice sensor 30a, and the auxiliary sensor part 40a are activated in parallel with the total analyzing part 50 (Operation 701).

Each sensor acquires a signal from the surrounding environment, using the capture apparatus 21, the recording apparatus 31, or the auxiliary sensor apparatus 41 (Operation 702).

Each of the image sensor 20a, the voice sensor 30a, and the auxiliary sensor part 40a analyzes the signal acquired in Operation 702, using the picture analyzing part 23a, the voice analyzing part 33a, or the signal analyzing part 43, and outputs analysis results (Operation 703).

Each of the image sensor 20a, the voice sensor 30a, and the auxiliary sensor part 40a obtains analysis results of the other sensors in the image sensor 20a, the voice sensor 30a, and the auxiliary sensor part 40a, and the total analyzing part 50 through the data/control signal communication units 70 to 75 (Operation 704).

Next, the auxiliary sensor part 40a is controlled referring to the obtained analysis results to obtain information, and person's position detection processing is conducted based on the information in the auxiliary sensor part 40a. First, it is checked whether or not person's position detection processing can be conducted with the currently acquired signal (Operation 705). In the case where the processing can be conducted (Operation 705: Y), person's position detection processing is conducted by using the currently acquired signal to output the results (Operation 706).

In the case where it is determined that person's position detection processing cannot be conducted with the currently acquired signal (Operation 705: N), and in the case where it is determined that the processing can be conducted and the person's position detection processing is conducted in Operation 706, it is checked whether or not there is sufficient information required for person's position detection processing in the currently acquired signal (Operation 707). In the case where there is not enough information (Operation 707: N), the control of the subsequent signal acquisition of the auxiliary sensor apparatus 41, the capture apparatus 21, and the recording apparatus 31 is given to the auxiliary sensor apparatus control part 42, the capture apparatus control part 22, and the recording apparatus control part 32 so as to obtain lacking information in the subsequent processing (Operation 708).

Next, the image sensor 20a controls the capture apparatus 21 to obtain a picture, referring to the output results of the auxiliary sensor part 40a, the voice processing results of the voice sensor 30a, and the picture processing results, checks its color information to determine the position of a person, and recognizes a human action. First, it is checked whether or not person's action recognition processing can be performed with the currently acquired signal (Operation 709). In the case where the processing can be conducted (Operation 709: Y), person's action recognition processing is conducted with the currently acquired signal to output the results (Operation 710). At this time, video data previously registered in the person's video storage part 232 and information on an action pattern in the action pattern storage part 234 are referred to.

In the case where it is determined that the person's action recognition processing cannot be conducted with the currently acquired signal (Operation 709: N), and in the case where it is determined that the processing can be conducted and the person's action recognition processing is conducted in Operation 710, it is checked whether or not there is sufficient information required for the person's action recognition processing in the currently acquired signal (Operation 711). In the case where there is not enough information (Operation 711: N), the control of the subsequent signal acquisition of the auxiliary sensor apparatus 41, the capture apparatus 21, and the recording apparatus 31 is given to the auxiliary sensor apparatus control part 42, the capture apparatus control part 22, and the recording apparatus control part 32 so as to obtain lacking information in the subsequent processing (Operation 712).

Next, the voice sensor 30a controls the recording apparatus 31 referring to the output results of the auxiliary sensor part 40a, the picture processing results of the image sensor 20a, and the voice processing results to obtain a voice. Then, the voice sensor 30a checks its wavelength information to determine the direction of a sound source, and recognizes a human voice. First, it is checked whether or not person's voice recognition processing can be conducted with the currently acquired signal (Operation 713). In the case where the processing can be conducted (Operation 713: Y), person's voice recognition processing is conducted with the currently acquired signal to output the results (Operation 714). At this time, voice data previously registered in the person's voice storage part 332 and information on a voice pattern in the voice pattern storage part 334 are referred to.

In the case where it is determined that person's action recognition processing cannot be conducted with the currently acquired signal (Operation 713: N), and in the case where it is determined that the processing can be conducted and the person's voice recognition processing is conducted in Operation 714, it is checked whether or not there is sufficient information required for person's voice recognition processing in the currently acquired signal (Operation 715). In the case where there is not enough information (Operation 715: N), the control of the subsequent signal acquisition of the auxiliary sensor apparatus 41, the capture apparatus 21, and the recording apparatus 31 is given to the auxiliary sensor apparatus control part 42, the capture apparatus control part 22, and the recording apparatus control part 32 so as to obtain lacking information (Operation 716).

Next, in the total analyzing part 50a, person's status recognition, person identification, and command understanding are conducted based on picture information, voice information, and information from the auxiliary sensor (Operation 717). In person identification, the person identifying part 52 identifies a person, referring to video information and voice information of a particular person previously registered in the person's information storage part 51. In command understanding, the command understanding part 55 refers to the information from the command dictionary storage part 54.

The results of command understanding obtained in Operation 717 are output to the application 60 through the output part 56 (Operation 718). Picture information, voice information and analysis results of the auxiliary sensor may be output together to the application 60.

In the case where signal processing is continued (Operation 719: Y), the process returns to Operation 702 to repeat signal processing.

A flow of the entire processing in Embodiment 3 is as described above.

Next, processing in each sensor, and processing in which respective sensors collaborate and refer to the results with each other will be descried in more detail.

First, processing in the auxiliary sensor part 40a will be described in detail.

In the case where an ultrasonic sensor is used as the auxiliary sensor apparatus 41, at least one ultrasonic transmitting element and at least one ultrasonic receiving element are prepared, and object arrangement information in a three-dimensional space is calculated based on amplitude information and phase information of a received signal when a reflective wave is received from a human being.

A moving object other than a still object can be detected by using amplitude information and phase information of an ultrasonic sensor. Thus, by detecting a moving object in an atmospheric space, the position of a human being is detected.

In the case where an infrared sensor is used as the auxiliary sensor apparatus 41, a temperature distribution in an environment is obtained as a picture form. By finding a region corresponding to a portion of a temperature of a human being and corresponding to the size of a human being, the place of a human being can be specified.

In the case where a range sensor is used as the auxiliary sensor apparatus 41, a moving object can be found by obtaining the difference in three-dimensional information between a certain point and a subsequent point, and the place of a human being is specified by finding an object corresponding to the size of a normal human being.

An example in which the capture apparatus and the recording apparatus utilize the information from the auxiliary sensor part 40a will be described. In the case of using an ultrasonic sensor, the positional information on a moving object in a space can be provided to the capture apparatus and the recording apparatus. When the positional information is known, the capture apparatus may detect a person only in a limited region in a large space, which enables a processing time to be substantially reduced. Furthermore, when the positional information is known, the recording apparatus does not need to detect the position of a sound source.

Next, an example in which the auxiliary sensor part 40a utilizes information from the capture apparatus and the recording apparatus will be described. In the case where the capture apparatus 21 and the recording apparatus 31 detects the position of a person and the position of a sound source by the function of each apparatus irrespective of the positional information from an ultrasonic sensor, the ultrasonic sensor scans the vicinity of the position based on the positional information and detects the presence absence of a moving object (person). Without an auxiliary sensor, the picture apparatus may recognize a portion other than a human being as the position of a human being, and the recording apparatus may detect a sound from a non-human sound source such as a TV and audio equipment. The ultrasonic sensor has an effect of preventing such erroneous detection.

Furthermore, an example in which the auxiliary sensor part 40a utilizes positional information on a moving object in a space to be detected by the auxiliary sensor part 40a. The auxiliary sensor part 40a utilizes positional information on a known moving object to restrict scanning only to the vicinity of the object, whereby high-speed scanning is realized. The auxiliary sensor part 40a can dynamically change a scanning position so as to follow the movement of the object. Thus, the auxiliary sensor part 40a is effective as an active sensor for tracking an object in real time.

Next, processing centering on the image sensor 20a will be described in detail.

The image sensor 20a may use one or a plurality of capture apparatuses. It is preferable that a capture apparatus, in which the control of optical parameters such as a capture direction, a capture position, a focus, a zoom, and an aperture can be entirely or partly altered, is used as the image sensor 20a.

In the case where a distance as well as a direction of a human place from the capture apparatus 21 are desired to be obtained in person's detection based on picture information, a plurality of capture apparatuses are used. Alternatively, one capture apparatus can be used if a capture position can be altered. Even if a capture position cannot be altered, optical parameters such as a focus, a zoom, and an aperture may be altered. In any apparatus setting, an apparatus/apparatuses is disposed so that at least two pictures can be captured depending upon different capture positions or different optical parameters, with respect to a human being in a range from which an application desires to receive a command. If the above-mentioned condition is satisfied, it is also possible to use a capture apparatus using a fish-eye lens, a capture apparatus capable of obtaining an arbitrary pixel of a picture by a CMOS system, and a capture apparatus capable of obtaining color other than visible light.

The capture direction is determined referring to the results obtained by detecting a person by the auxiliary sensor part 40a, the results obtained by detecting a sound source direction, using voice information of the voice sensor 30a, and the results obtained by detecting a person's position based on picture information. More specifically, in the case where the position of a person has been detected prior to a certain point of time; in addition, this position is matched with the estimated sound source direction; and an object is an actual living human being, the capture direction is determined so as to observe the vicinity thereof. However, in the case where the estimated direction of a human being determined immediately before is different from the estimated direction sensed by the auxiliary sensor part 40a, and in the case where a living human being cannot be confirmed immediately before, the capture direction is determined so as to observe the vicinity of the human detection results of the auxiliary sensor part 40a.

In this capture direction determination processing, the capture direction is not changed exceeding a speed at which a human being can move. For example, the capture direction is not changed to a position of 5 m away after 0.1 seconds. In the case where the immediately preceding results are different from those of the auxiliary sensor part 40a, capture is conducted again in the direction in accordance with the immediately preceding results. Furthermore, even in the case where the presence of a living human being has not been confirmed, the last capture direction in which the presence of a human being has been confirmed is compared with the direction pointed by the auxiliary sensor part 40a. If the capture direction is changed exceeding a moving speed of a human being, the direction in which a picture has been captured last is maintained.

Optical parameters such as a focus, a zoom, and an aperture in capturing are adjusted so as to capture the vicinity of the position of a human being detected immediately before. In the case where the auxiliary sensor part 40a can output a distance to a human being, such voice information and picture information are referred to in the same way as in the control of a direction.

In person detection based on an image, sound source detection based on a voice, and person's position detection by the auxiliary sensor 40a, when a person and a sound source have not been detected due to the influence of an obstacle, the direction and position in which a picture should be captured are specified from each detection process. Therefore, the capture apparatus 21 is controlled so as to observe the specified direction and position.

Next, registration of person's video pattern information in the person's video storage part 232 and registration of an action pattern in the action pattern storage part 234 will be described.

Prior to the person detection processing of the person detecting part 231 and the action recognition processing of the action recognizing part 233, person's video pattern information is registered in the person's video storage part 232, and an action pattern is registered in the action pattern storage part 234.

The person's video storage part 232 stores person's video pattern information that allows a human being to be recognized and the position and direction of the human being to be specified. The direction of a human being in a video pattern is assumed to be a capture direction of a human being in human recognition and position and direction specification. This is based on the position of the previously disposed capture apparatus 21, and a range of a human direction with respect to a display apparatus displaying an output of the application 60a and a display apparatus whose operation is permitted by the application 60a. A resolution (which may be a "size", corresponding to an area converted by the number of pixels) of a picture for capturing a human being is assumed to be a resolution required for specifying the direction of a human being. In the case where the direction of a human being is determined by the direction of a face, a picture with a resolution that allows the position of a contour of a face, eye, a nose, and a mouth to be determined. In the case where the direction of a human being is determined based on the direction of eyes, a picture is captured so that eyes can be identified, and the positions of white parts and black parts of the eyes are determined so as to identify a line of sight.

As described above, a plurality of pictures of a human being may be captured in accordance with the directions of the capture apparatus and the human being and the distance therebetween. Furthermore, in accordance with the requirements of the application 60a, pictures with different facial expressions (smiling face, crying face, etc.), and pictures with and without make-up, beard, and glasses may be captured.

As long as the above-mentioned information can be reproduced, a data amount of a picture to be stored may be compressed. Furthermore, as long as the direction and position of a human being can be specified, only portions such as a face and eyes may be stored instead of the entire body of a human being. The above-mentioned information may be combined to be stored. For example, compressed information on the entire body of a human being and uncompressed information on feature portions may be combined.

The action pattern storage part 234 stores the action of a human being required for the application 60a to recognize a command. Changes in coordinates of the skin in a main joint portion, such as a hand, a leg, a head, and an elbow can also be stored as an action pattern.

Next, person detection processing based on picture information in the image sensor 20a will be described. The person detection processing is conducted as follows.

Picture information used for detecting a human being, captured by the image sensor 20a, is assumed to be captured by referring to the output of the auxiliary sensor part 40a, the sound source detection results of the voice sensor 30a, and the human being detection results obtained by the image sensor 20a. Color information and positional information of pixels are used for searching for a region corresponding to a face in the input picture. Then, the direction in which a human being is present is calculated from the position of the capture apparatus and the detection position on the picture in accordance with a camera model such as a pinhole camera. In the case where there are a plurality of capture apparatuses and a human being is detected on a plurality of pictures, the position as well as the direction of a human being is also calculated based on the principle of triangulation.

As picture information representing a human face, those registered in the person's video storage part 232 are used. As described later, those registered in the person's video storage part 232 include a person's picture captured from the front and a person's picture captured from the side in accordance with the specification of the application 60a. In this case, person's face is detected in all the registered directions.

In the case where the presence of a human being cannot be confirmed even if it was confirmed immediately before, each sensor is instructed to confirm information by enhancing the sensitivity. More specifically, the recording apparatus is instructed to increase a volume and a sampling interval. The auxiliary sensor part 40a is instructed to decrease a scanning interval of an environment. The capture apparatus is instructed to enhance a resolution by a zoom. In the case where it is determined that a person cannot be detected, it is determined that there is not a human being in a capture direction.

Action recognition based on picture information and voice information in the image sensor 20a is conducted as follows. Picture information used for action recognition is assumed to be captured by referring to the output of the auxiliary sensor part 40a, the sound source detection results of the voice sensor 20a, and the immediately preceding human detection results of the image sensor 20a. In the same way as in the information stored in the above-mentioned action pattern storage part 234, information is extracted from an input picture, and its change is matched with an action pattern stored in the action pattern storage part 234. Matching between the action in the input picture and the action in the action pattern is determined by obtaining the difference between corresponding pictures in both continuous pictures as a moving picture, and accumulating the difference values throughout the moving picture. Alternatively, a change in the input picture is approximated by discrete cosine transformation (DCT), Fourier transformation, or the like, and the action in the similarly approximated action pattern is compared with a transformed coefficient, whereby matching is determined.

In the case where the presence of a human being is confirmed, but an action command cannot be understood, each sensor is instructed to confirm information by enhancing the sensitivity. More specifically, the recording apparatus is instructed to increase a recording volume and a sampling interval. The auxiliary sensor part 40a is instructed to decrease a scanning interval of an environment. The capture apparatus is instructed to enhance a resolution by a zoom.

Next, processing centering on the voice sensor 30a will be described in detail.

The voice sensor 30a is disposed in such a manner that a plurality of recording apparatuses or one recording apparatus can obtain a human voice in a range from which the application 60a is to receive a command.

The output of the recording apparatus is assumed to be a signal regarding a voice in a particular direction, referring to the human detection results obtained by the auxiliary sensor part 40a, the results of detecting a human position obtained by using picture information, and the results of sound source direction detected based on voice information. More specifically, in the case where a sound corresponding to a human voice is detected before a certain point of time, the direction of the detected voice is matched with the direction determined from a picture in which a human being is present, and an object is identified as an actual human being, information on a voice signal from the vicinity of the direction is output. However, in the case where the direction in which the presence of a human being is determined immediately before is different from the direction in which the presence of a human being is determined by the auxiliary sensor 40*a*, or in the case where a human being cannot be confirmed immediately before, information on a voice signal from the vicinity of the direction of the person detection results obtained by the auxiliary sensor part 40*a* is output.

In the case where a human being and a sound source cannot be detected due to the influence of an obstacle in human detection based on a picture, a sound source detection based on a voice, and person's position detection by the auxiliary sensor 40*a*, the direction in which the recording apparatus 31 is to record is specified from each detection process. Therefore, voice information from the direction is output.

Next, sound source detection processing will be described. Voice information used for sound source detection is assumed to be voice information output in a particular direction, referring to the output of the auxiliary sensor part 40*a*, the human detection results of the image sensor 20*a*, and the immediately preceding sound source detection results. The presence/absence of a person's voice is determined by investigating frequency characteristics of voice information and determining matching between the frequency characteristics of voice information and the information stored as a person's voice described later. In the case where it is determined that there is no person's voice, it is determined that there is no human being in a direction in which voice information is obtained.

In the case where a plurality of recording apparatuses 31 are disposed at some distance from each other, a sound source position is specified based on the difference in time at which a voice is recorded. Furthermore, in the case where a plurality of recording apparatuses are disposed respectively at a plurality of places, a sound source direction is specified at each place. An overlapped sound source direction calculated from a group of recording apparatuses at the respective places is obtained, whereby a sound source position is determined. In the case where a sound source cannot be confirmed even if a human voice was confirmed immediately before, each sensor is instructed to confirm information by enhancing the sensitivity. More specifically, the recording apparatus is instructed to increase a recording volume and a sampling interval. The auxiliary sensor part 40*a* is instructed to decrease a scanning interval of an environment. The capture apparatus is instructed to enhance a resolution by a zoom.

In voice recognition based on voice information and picture information, picture information used for the voice recognition is assumed to be captured by referring to the output of the auxiliary sensor part 40*a*, the sound source detection results, and the immediately preceding person detection results. In the case where a human voice is detected, but a voice command cannot be understood, each sensor is instructed to confirm information by enhancing the sensitivity. More specifically, the recording apparatus is instructed to increase a recording volume and a sampling interval. The auxiliary sensor part 40*a* is instructed to decrease a scanning interval of an environment. The capture apparatus is instructed to enhance a resolution by a zoom.

Next, processing centering on the total analyzing part 50*a* will be described in detail.

Prior to the person identification processing in the person identifying part 52, and the person's status recognition processing in the person's status recognizing part 53, registered information in the person's information storage part 51 and registered information in the command dictionary storage part 54 are updated.

The person's information storage part 51 stores video information, voice information, and information required for identifying a particular person or a plurality of persons which the application 60*a* operates. As the video information, a sample video of each person required for specifying a person is stored. A plurality of pictures may be previously captured in plural directions and at plural distances. Furthermore, depending upon the requirements of the application 60*a*, pictures with different facial expressions (smiling face, crying face, etc.), pictures with and without make-up, beard, and glasses may be captured. As long as a picture required for specifying a person can be reproduced, the amount of data of a picture to be stored may be compressed. Furthermore, only a face or only a part such as eyes, a mouth, and a nose required for confirming the difference between individuals may be stored. Furthermore, the above-mentioned information may be combined. Alternatively, as long as the information can be reproduced, the information is compressed, and stored in combination.

As the voice information, a voice spoken by each person required for specifying a person is stored. A spoken voice of each person is stored individually. A command to be received by the application 60*a* is stored, or a spoken voice required for reproducing a command to be received by the application 60*a* is stored. In the latter case, a phoneme and a word obtained by decomposing a command is recorded. In storage, frequency characteristics for each command, phoneme, or word, or changes in frequency characteristics can be stored instead of that a recorded voice is stored as it is. The above-mentioned information may be combined. Alternatively, as long as the information can be reproduced, it can be compressed, and stored in combination.

The command dictionary storage part 54 stores two kinds of information. One is a link representing a relation between each command inputted to the application 60*a* and a command in the action pattern storage part 234 and the voice pattern storage part 334. The other is a list of commands that can be accepted by the application 60*a* in the respective cases. The latter command dictionary is rewritten by the application 60*a* successively in accordance with the process of the application 60*a*. Thus, in command understanding processing based on action recognition results and voice recognition results, a command dictionary is always referred to in each processing.

Next, person identification in the person identifying part 52 of the total analyzing part 50*a* will be described. The person identifying part 52 can confirm a person's video in person detection processing in the image sensor 20*a* and detect a person's voice in sound source detection processing in the voice sensor 30*a*. Only in the case where the position detected by the person detection results and the position detected by the sound source detection results are overlapped, it is determined that a person can be observed correctly. In person identification and command understanding described later, the picture information and voice information are treated as effective ones only when an existence of a human being is confirmed. In the case where the person identifying part 52 determines that a person is observed, the position and direction of a human being are output as the position where the person position detection results of the auxiliary sensor part 40*a*, the person detection results based on picture information, and the sound source detection results based on voice information are overlapped. A posture follows the person detection results based on the picture information.

The person identifying part 52 matches the picture information and voice information with those of a particular person previously registered in the person's information storage part 51, thereby identifying the person. Prior to matching, regarding the picture information obtained by the capture apparatus 21 and the voice information obtained by the recording apparatus 31 are processed. This processing is conducted in the same way as in storing video information on a particular person and voice information on a particular person in the person's information storage part 51.

For example, in the case where picture information and voice information are effective, and a person determined by picture information is matched with a person determined by voice information, the person is determined as person identification results. If not, an evaluated score given to the results determined by the picture information and an evaluated score given to the results determined from the voice information are compared with each other, and the larger one is determined to be person identification results. When both the evaluated scores are compared with each other, a weighing coefficient for setting a balance between the picture information and the voice information may be prepared, and the weight may be considered.

Furthermore, the history of the person determined by the picture information and the person determined by the voice information may be referred to. In the case where the person is determined by the picture information and the voice information, an evaluated score is given to each person, whereby a plurality of candidates are selected. These are combined in accordance with the above-mentioned method, and a plurality of candidates with points, referring to both the picture information and the voice information are obtained. When these historical scores are accumulated for each candidate, and the accumulated value exceeds a previously set value, the person is determined to be recognized. Once the person is recognized, the person is held until person detection and voice detection are terminated for a predetermined period of time. When person detection and voice detection are terminated for a predetermined period of time, this history is cancelled, and particular accumulation is started again. In the case where the presence of a human being cannot be confirmed in the person's status recognizing part 53, but one of the picture information and the voice information is obtained, person identification is conducted with respect to the obtained picture information or voice information; then a low score is given to the results and accumulated in the historical score. Determination of a person (i.e., determination of whether or not an accumulated value exceeds a previously set certain value) is conducted only in the case where the presence of a person is confirmed in the person's status recognizing part 53.

Next, person's status recognition processing in the person's status recognition part 53 will be described. Herein, a person's status refers to the position, direction, and posture of a person. A direction in which a human being is present is found from the auxiliary sensor part 40*a*. A distance from the apparatus to the human being is also found by the function of the auxiliary sensor part 40*a*. Only in the case where the presence of a human being is confirmed, a direction and a distance are found from the picture information of the image sensor 20*a*. Furthermore, in the case where information on the direction of a face is registered, a posture (direction of a face) is also found. From the voice information of the voice sensor 30*a*, the direction in which a human voice is heard is found only in the case where a human voice is confirmed. In the case where a plurality of recording apparatuses are disposed at a plurality of places in an environment, the position of a human being in the environment is found.

Next, command understanding based on the action recognition results and voice recognition results will be described.

Correspondence between the commands is checked. One is the command obtained by the action recognition results and the voice recognition results while a person is identified in person identification. The other is the command of the application 60*a* stored in the command dictionary storage part 54. In the case where the command determined from an action and the command determined from a voice correspond to the commands of the application 60*a*, and the commands are in a list of commands which the application 60*a* can accept, these commands are determined to be understood. In the case where it is determined that a person is identified in person identification, and one of the action recognition results and the voice recognition results is obtained, if the command obtained from the results is in a list of commands which the application 60*a* can accept, this command is determined to be understood.

The contents of the command understood as described above are provided to the application 60*a*. The information on the position, direction, and posture of a person recognized by the person's status recognizing part 53, the information representing a particular person in the person identifying part 52, and the information on the command understood in the command understanding part 55 are given to the application 60*a*, in the case where there is an inquiry from the application 60*a*. Alternatively, instead of waiting for an inquiry from the application 60*a*, as soon as the information is obtained, it may be sent to the application 60*a* via the communication part 57. Alternatively, when the required information is set, it may be sent to the application 60*a*.

Next, generation processing of a command dictionary in the total analyzing part 50*a* will be described. Prior to the beginning of the application 60*a*, a link representing the relation between each command to be accepted by the application 60*a* and commands in the action pattern storage part 234 and the voice pattern storage part 334 is stored in the command dictionary storage part 54. Furthermore, a list of commands that can be accepted by the application 60*a* in the command dictionary storage part 54 is set by the application 60 in accordance with the situation, after the application 60*a* is started. By nullifying the list, commands can be prevented from being accepted.

Embodiment 4

Figure 8:
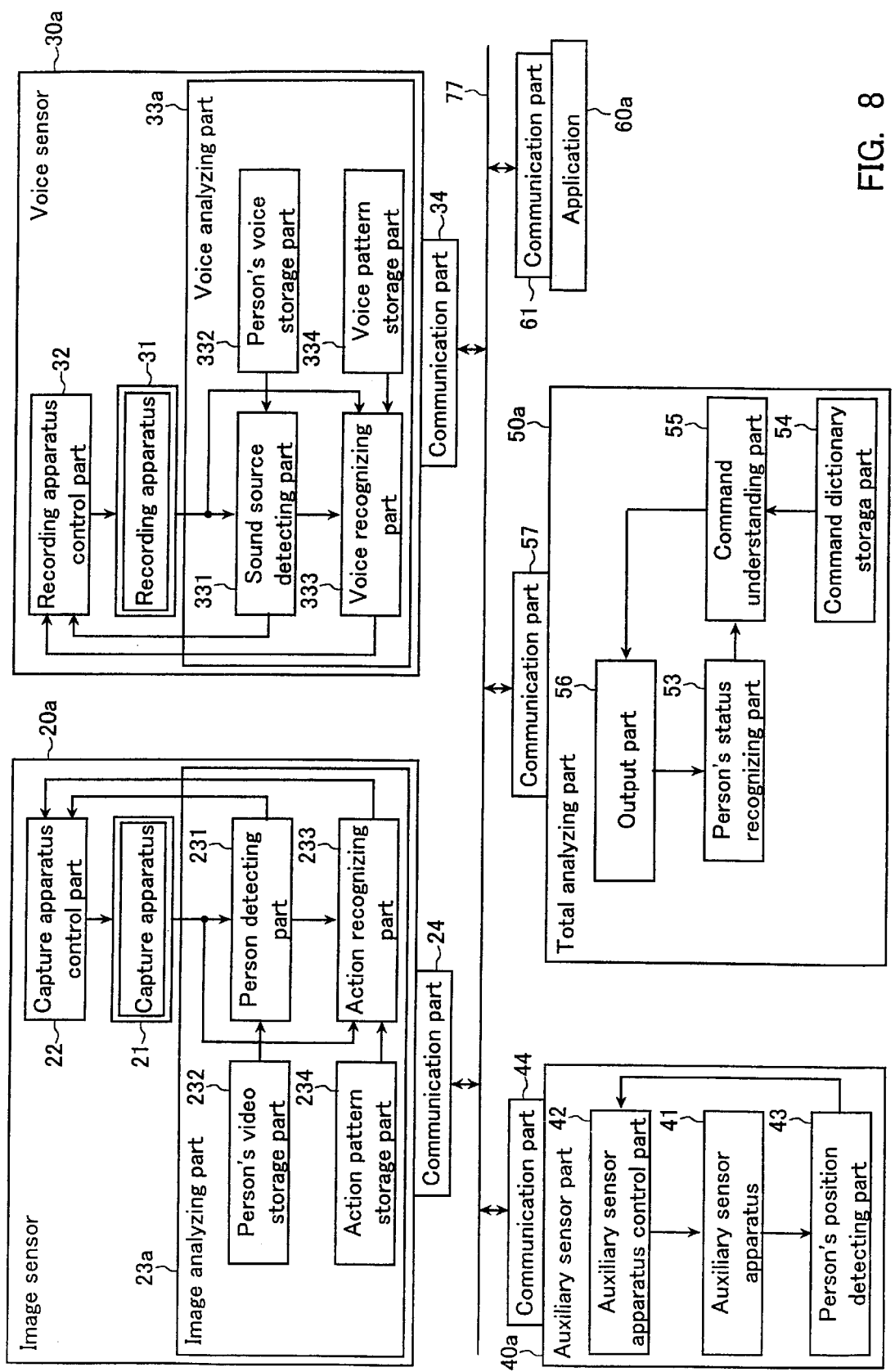
FIG. 8 is a block diagram schematically showing an apparatus configuration of a human interface system using a plurality of sensors of Embodiment 4 according to the present invention.

FIG. 8 shows an exemplary configuration of Embodiment 4.

In the exemplary configuration of Embodiment 4 shown in FIG. 8, an action command, a voice command, and a person's status of an unspecified person. Compared with the exemplary configuration shown in FIG. 6 described in Embodiment 3, the configuration of the total analyzing part 50*b* is different. In the configuration of Embodiment 4, the total analyzing part 50*b* does not include a person's information storage part 51 and a person identifying part 52. Furthermore, the command understanding part 55 receives the results of the person's status recognizing part 53 directly, not via the person identifying part 52.

According to the above-mentioned configuration, person identification processing is not particularly conducted. Information on all the input people is processed, whereby an action command, a voice command, and a person's status of an unspecified person are understood.

Embodiment 5

Figure 9:
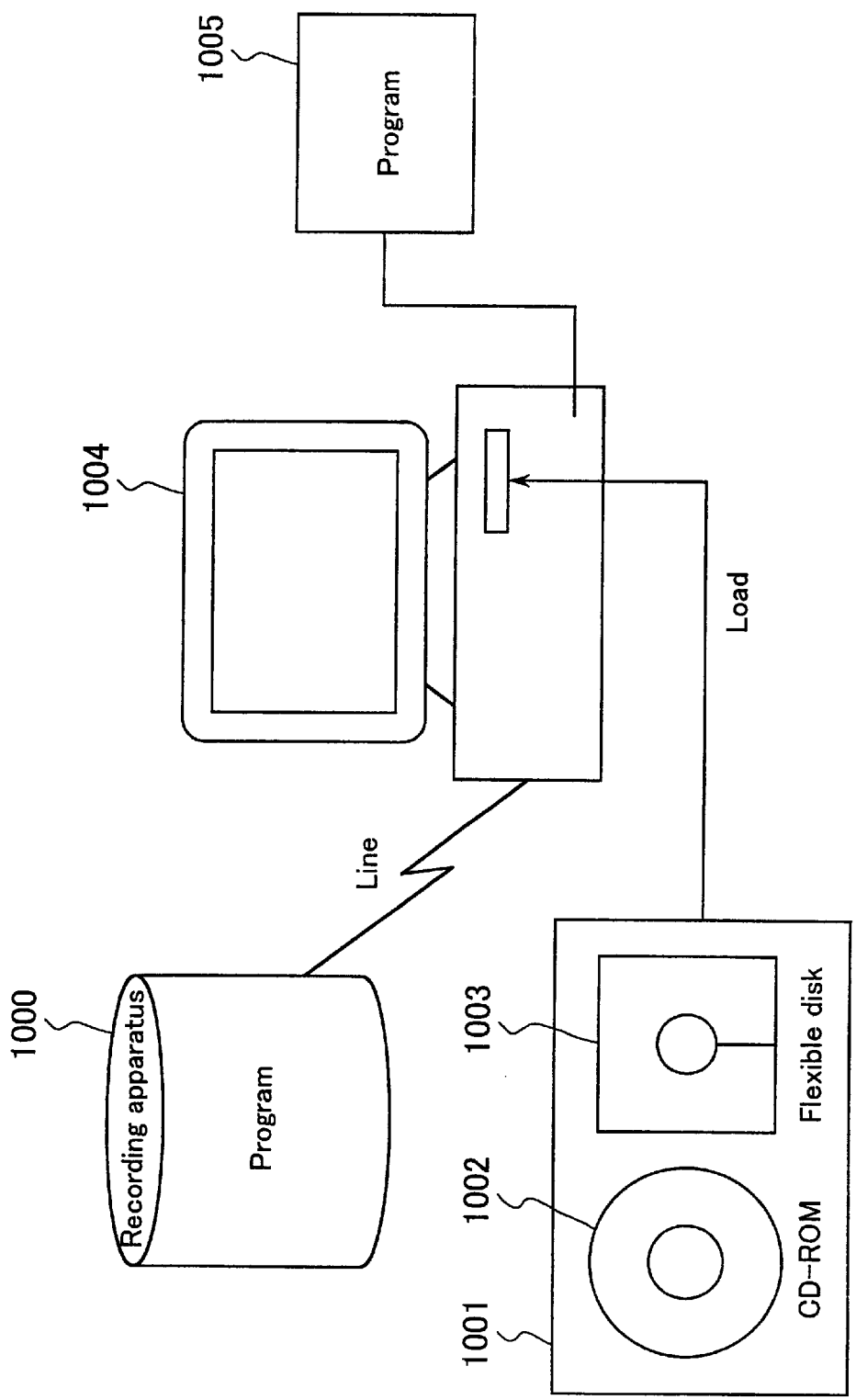
FIG. 9 is a diagram showing recording media storing a processing program for realizing a human interface system using a plurality of sensors of Embodiment 5 according to the present invention.

The human interface system using a plurality of sensors of the present invention can be configured with various kinds of computers by recording a program describing processing operations for realizing the above-mentioned configuration on a computer-readable recording medium. Examples of the recording medium storing a program including the processing operations for realizing the human interface system using a plurality of sensors of the present invention include not only a portable recording medium 1001 such as a CD-ROM 1002 and a flexible disk 1003, but also a recording medium 1000 in a recording apparatus on a network and a recording medium 1005 such as a hard disk and a RAM of a computer, as shown in FIG. 9. In execution, the program is loaded onto a computer 1004, and executed on a main memory.

According to the human interface system using a plurality of sensors of the present invention, picture information and voice information are used simultaneously. Because of this, a picture of a human being and a mannequin are prevented from being recognized as a human being, and voice information from a loudspeaker of acoustic equipment that is not a human being is prevented from being recognized as a human voice. This reduces a malfunction of man-machine interface. Similarly, picture information and voice information utilize processing results with each other, a video that does not utter a voice is prevented from being targeted for processing, and a voice in the absence of a human being is prevented from being targeted for processing, which reduces the probability of error processing. Furthermore, since data to be targeted for processing is decreased, a processing speed is increased.

According to the human interface system using a plurality of sensors of the present invention, information other than the picture information and voice information are obtained by using an auxiliary sensor, whereby a search range for processing a picture and a voice is narrowed, and a processing speed can be enhanced. Furthermore, by utilizing information of an auxiliary sensor, the number of capture apparatuses and recording apparatuses can be reduced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A human interface processing method using a plurality of sensors, comprising:
    at least two kinds of sensor processings, each determining a range of a detection target and a detection sensitivity and acquiring a particular detection signal from the detection target at the detection sensitivity, the respective detection signals acquired by the sensor processings being of different types;
    total analyzing processing, investigating whether or not there is inconsistency among signal detection results detected by the respective sensor processings, and generating control information for the respective sensor processings;
    application processing utilizing the signal detection results obtained by the respective sensor processings; and
    communication processing communicating data and control information between the respective sensor processings, between the respective sensor processings and the total analyzing processing, and between the total analyzing processing and the application processing, wherein each of the sensor processings uses either of, or a combination of:
        the signal detection results or control information obtained from the other sensor processings, and
        the control information obtained from the total analyzing processing,
    thereby determining a range of a detection target and a detection sensitivity at a time of subsequent signal acquisition;
    each of the sensor processings outputs its signal detection results, and control information used by the other sensor processings to determine a range of a detection target and a detection sensitivity at a time of subsequent signal acquisition to the other sensor processings through the communication processing, and
    the total analyzing processing outputs control information used by each of the sensor processings to determine a range of a detection target and a detection sensitivity at a time of subsequent signal acquisition through the communication processings.

2. A human interface processing method using a plurality of sensors according to claim 1, wherein the detection target is a human being, and the sensor processings include at least image sensor processing and voice sensor processing,
    a detection signal of the image sensor processing is human recognition information,
    the image sensor processing includes action recognition processing for interpreting an action of the detection target based on picture recognition results and recognizing a command inputted through a gesture,
    a detection signal of the voice sensor processing is human voice recognition information, and
    the voice sensor processing includes voice recognition processing for interpreting a voice of the detection target based on voice recognition results and recognizing a command inputted through a voice.

3. A human interface processing method using a plurality of sensors according to claim 1, wherein:
    the detection target is a human being;
    the sensor processings include at least image sensor processing and auxiliary sensor processing;
    a detection signal of the image sensor processing is human picture recognition information;
    the image sensor processing includes action recognition processing interpreting an action of the detection target based on picture recognition results and recognizing a command inputted through a gesture; and
    a detection signal of the auxiliary sensor processing is information useful for detecting human position information.

4. A human interface processing method using a plurality of sensors according 3, wherein one of, or a combination of, ultrasonic sensor processing, infrared sensor processing, and range sensor processing is used as the auxiliary sensor processing.

5. A human interface processing method using a plurality of sensors according to claim 1, wherein the detection target is a human being, and:
    the sensor processings include at least voice sensor processing and auxiliary sensor processing;

a detection signal of the voice sensor processing inhuman voice recognition information;

the voice sensor processing includes voice recognition processing for interpreting a voice of the detection target based on voice recognition results and recognizing a command inputted through a voice; and a detection signal of the auxiliary sensor processing is information useful for detecting human position information.

6. A human interface processing method using a plurality of sensors according 5, wherein either of, or a combination of, ultrasonic sensor processing, infrared sensor processing, and range sensor processing is used as the auxiliary sensor processing.

7. A human interface processing method using a plurality of sensors according to claim 1, wherein the detection target is a human being, and:

the sensor processings include at least image sensor processing, voice sensor processing, and auxiliary sensor processing;

a detection signal of the image sensor processing is human picture recognition information;

the image sensor processing includes action recognition processing interpreting an action of the detection target based on picture recognition results and recognizing a command inputted through a gesture; and a detection signal of the voice sensor processing is human voice recognition information;

the voice sensor processing includes voice recognition processing interpreting a voice of the detection target based on voice recognition results and recognizing a command input by a voice input; and a detection signal of the auxiliary sensor processing is information useful for detecting human position information.

8. A human interface processing method using a plurality of sensors according 7, wherein one of, or a combination of, ultrasonic sensor processing, infrared sensor processing, and range sensor processing is used as the auxiliary sensor processing.

* * * * *

UNITED STATES PATENT AND TRADEMARK OFFICE
CERTIFICATE OF CORRECTION

PATENT NO. : 6,686,844 B2
DATED : February 3, 2004
INVENTOR(S) : Masaki Watanabe et al.

It is certified that error appears in the above-identified patent and that said Letters Patent is hereby corrected as shown below:

Column 27,
Line 11, after "according" insert -- to claim --.

Column 28,
Line 15, after "according" insert -- to claim --.

Signed and Sealed this

Twenty-second Day of June, 2004

JON W. DUDAS
*Acting Director of the United States Patent and Trademark Office*